United States Patent

Schwartz, Jr.

[15] 3,675,679

[45] July 11, 1972

[54] PRESSURE RELIEF VALVE CONSTRUCTION FOR RAILWAY TANK CARS AND THE LIKE

[72] Inventor: Frederich William Schwartz, Jr., Clarendon Hills, Ill.

[73] Assignee: Jamesbury Corp., Worcester, Mass.

[22] Filed: Dec. 29, 1970

[21] Appl. No.: 102,443

Related U.S. Application Data

[63] Continuation-in-part of Ser. No. 91,907, Nov. 23, 1970, abandoned.

[52] U.S. Cl.....................137/587, 137/529, 137/505.14, 137/492.5
[51] Int. Cl.....................................F16k 31/12
[58] Field of Search..................137/116, 118, 467, 492, 469, 137/505.14, 522, 523, 629, 492.5, 587

[56] References Cited

UNITED STATES PATENTS

| | | | |
|---|---|---|---|
| 3,229,713 | 1/1966 | Wiegand | 137/467 |
| 3,583,422 | 6/1971 | Dach et al | 137/505.14 X |
| 2,644,480 | 7/1953 | Earle et al | 137/469 |

*Primary Examiner*—Henry T. Klinksiek
*Attorney*—John L. Alex

[57] ABSTRACT

Conventional spring type pressure relief valves used on fluid pressure containing tanks function at a single, preset tank internal pressure and provide a fixed orifice and flow area for discharging tank contents.

When an essentially conventional spring type pressure relief valve opens and remains open for a significant period of time it may be implied that an emergency condition exists, probably due to excessive heat input as from a fire, and that tank internal pressure exceeds the valve set-to-discharge pressure. This invention identifies the emergency condition by means of the time-dwell of the valve in open position, and actuates a secondary mode of valve operation which provides (a) reduced set-to-discharge pressure compatible with tank shell strength at the elevated temperature produced by the fire condition and (b) additionally provides increased discharge capacity to allow sufficient flow to attain a reduced tank internal pressure level.

24 Claims, 10 Drawing Figures

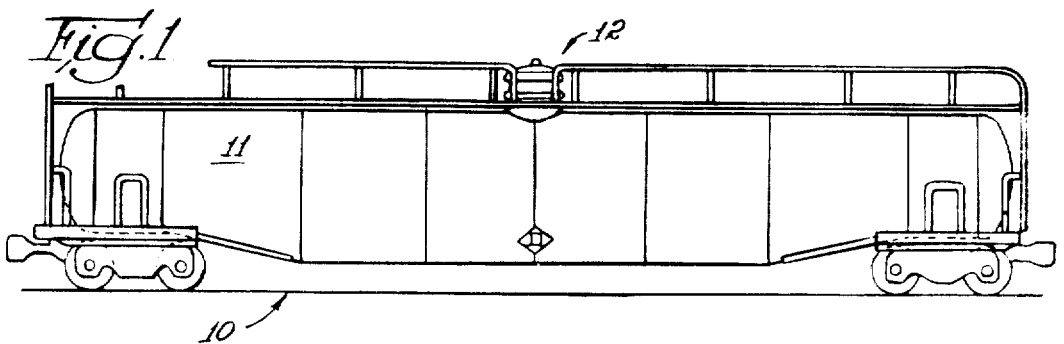
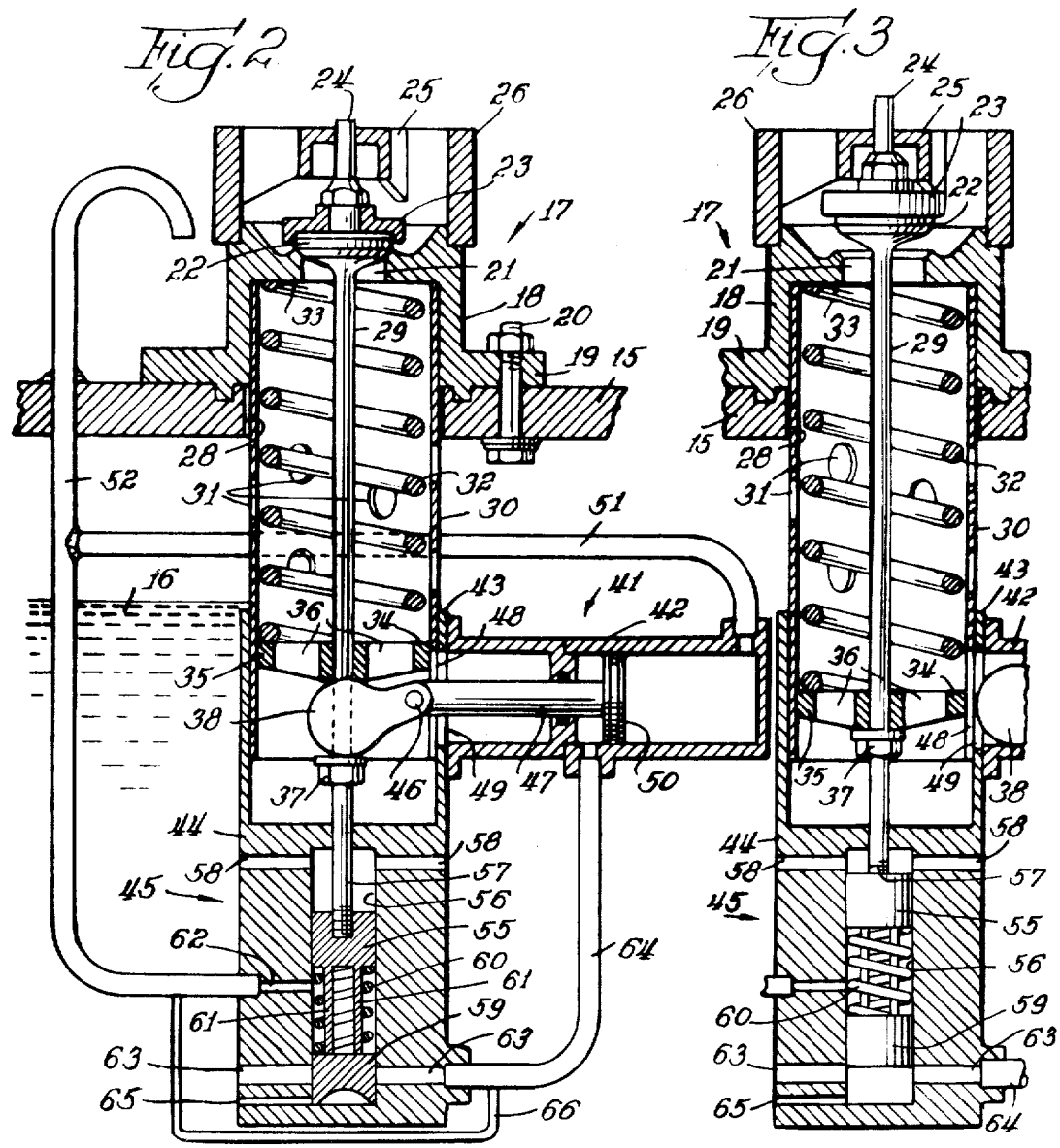

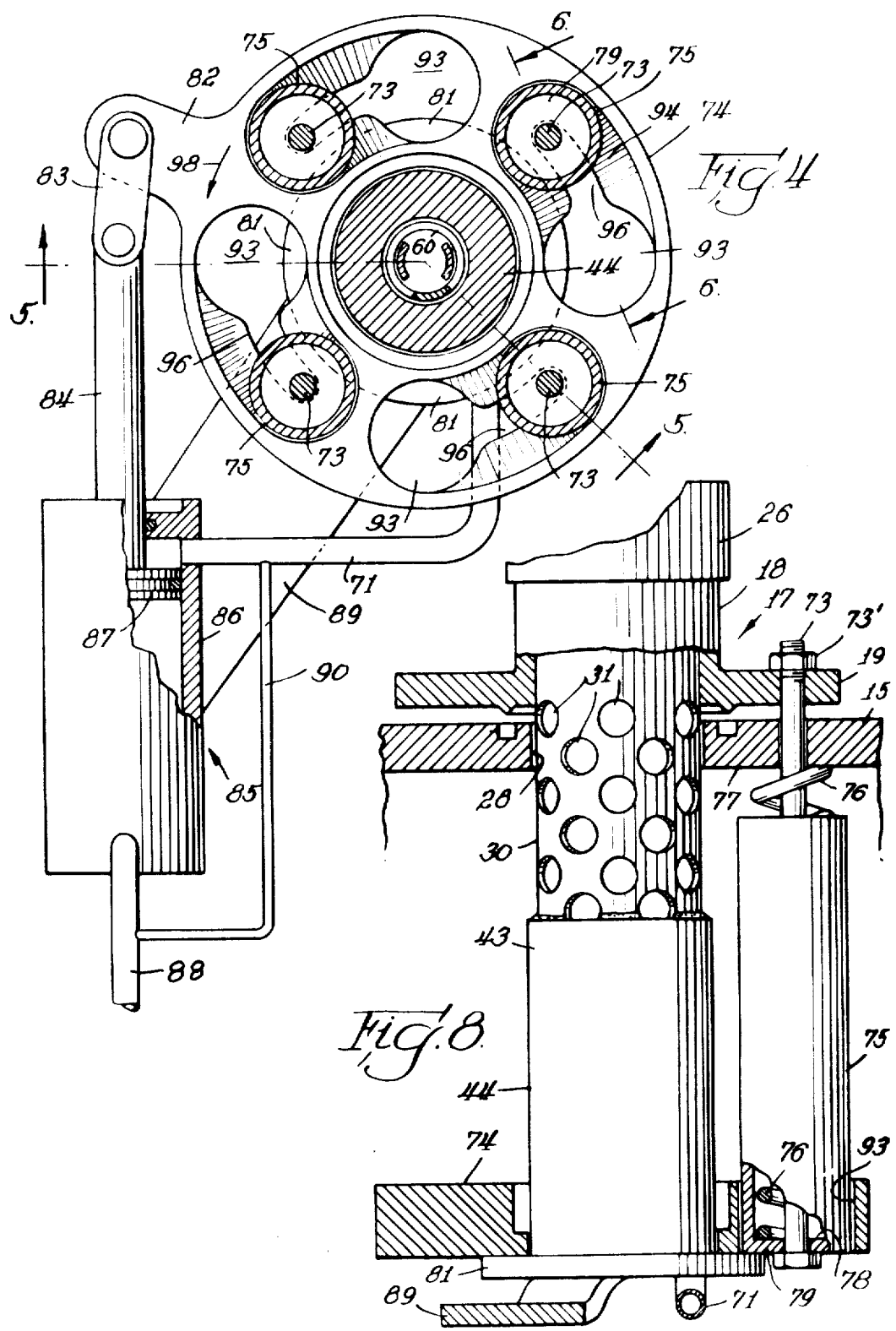

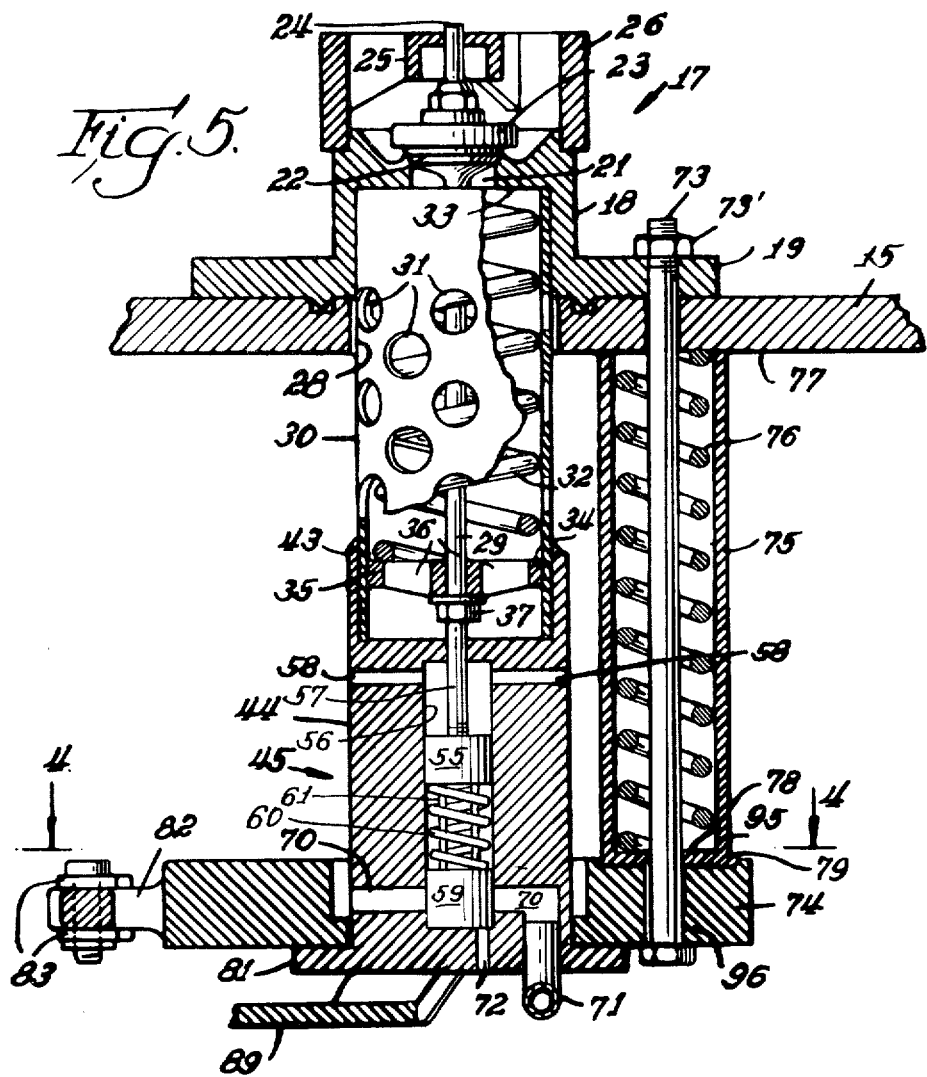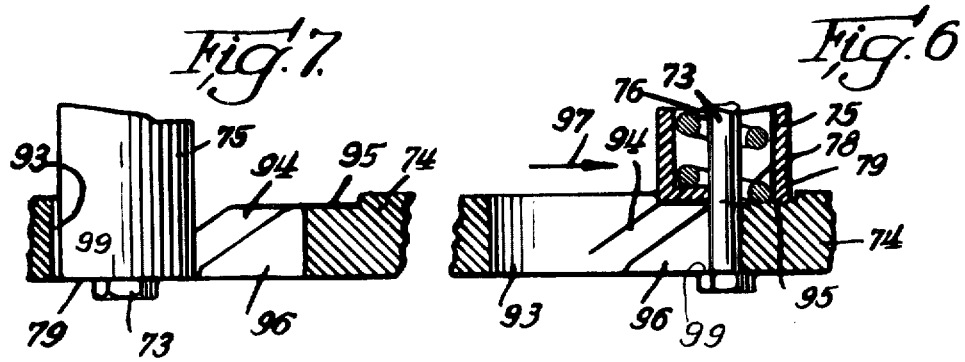

PRESSURE RELIEF VALVE CONSTRUCTION FOR RAILWAY TANK CARS AND THE LIKE

This application is a continuation-in-part of application, Ser. No. 91,907, filed Nov. 23, 1970, now abandoned.

This invention relates, generally, to pressure relief valve constructions for pressure vessels, such as are used for railway tank cars, tank trucks and the like and it has particular relation to such constructions arranged to release the tank contents at a lower pressure and increased volume than it is released initially and normally.

A safety relief valve or other pressure relieving device is provided on pressure vessels to prevent excessive pressure within the vessel. This is necessary to insure against rupture of the shell, usually with explosive force when excessive gas pressures are present. Even in cases involving containment of highly toxic or flammable gases, the lesser risk is controlled release of the contents of the vessel in preference to structural failure of it. Normally such a release through a pressure relieving device is much smaller in volume and therefore in consequence than the complete and rapid release which accompanies a tank shell rupture. It is also characteristic of pressure tank failures that large amounts of potential energy are transformed to propelling forces scattering physical damage over large areas.

In the majority of cases the structural design of the pressure vessel and the design of the safety relief valve are carefully integrated so as to provide adequate factors of safety. The vessel design is fundamentally related to the vapor pressure of the product to be contained under prescribed conditions. Because the vapor pressure of liquids varies directly with temperature, the maximum temperature to be encountered in service must be taken into account. Thus temperature becomes the basic design parameter for determining product vapor pressure and ultimately, by means of factoring, the design pressures of the tank and safety valve. It follows that, in ordinary service and with exposure to normal ambient and other conditions, the safety valve rarely functions at all. Only under exceptional exposures, such as fire, does the vapor pressure exceed design conditions.

Not only is the pressure setting of the relief valve of basic importance in relation to tank design pressure but its ability to discharge gas in sufficient volume to prevent pressure buildup, even though the valve is open, is considered in advance. For a specific case it is possible to predetermine the flow capacity required to prevent a pressure increase and to design a valve to so limit the pressure rise. It is a related fact that, as external fire causes the vapor pressure inside the tank to rise, the heat must pass through the wall of the tank thereby elevating the metal temperature as well. This condition of shell heating is most evident in areas in which the tank contains gas rather than liquid. That temperature may exceed 1,000° F. It is a corollary fact that, as the temperature of metals rises above a specific level, the strength of the metal rapidly diminishes. The metal shell of a pressure tank in a fire, then, loses its ability to safely contain the design pressure of the fluid within it.

Among the objects of this invention are: To provide for controlling the relief of pressure from a fluid pressure tank and to take into account reduced strength of the tank wall resulting from external application of heat thereto; to utilize the time duration in the open position of a pressure relief valve for changing the pressure at which it is relieved; to employ a spring biased relief valve arranged to open at a predetermined pressure and to reduce the compression of the spring or springs biasing the valve closed as a result of a continuous time extended opening of the valve; to hold a complete valve assembly in sealing engagement with the tank wall and to release such sealing engagement to the control of pressure from auxiliary springs; and to increase the discharge capacity of the system under emergency conditions.

A spring biased safety valve is arranged to relieve pressure in a tank when it reaches a predetermined value resulting from application of external heat with the consequences of increased internal pressure and reduction in tank wall strength. After extended time-dwell in the open position the valve actuating modifying means operates to reduce the safety valve set pressure and to increase the flow area, and therefore the discharge capacity. The modified safety valve set-pressure may be achieved by either altering the compression of the valve spring or by bringing into operation springs to exert a biasing force to retain the valve assembly on its mounting plate. Such springs may be designed to exert a force equal to any desired internal balancing pressure.

The flow area is increased by permitting the entire safety valve assembly to be lifted, by internal tank pressure and opposed by retaining springs aligned with the mounting bolts, from its mounting plate. The resulting increase in flow area produces an increased discharge rate of the fluid within the tank. Alternatively, or in a supplementary way, the valve actuating modifying means opens tank filling or emptying valves to discharge tank contents at an increased rate.

In the drawings:

FIG. 1 is a view, in side elevation, of a typical railway tank car in which the present invention can be embodied.

FIG. 2 is a vertical sectional view of a safety valve assembly constructed in accordance with a portion of this invention and illustrated in the closed position.

FIG. 3 is a view, similar to FIG. 2, showing the safety valve in the open position and the system operated to permit the valve to open at a lower pressure than the arrangement shown in FIG. 2.

FIG. 4 is a horizontal sectional view taken generally along line 4—4 of FIG. 5 and shows additional elements of the invention relating to the spring mounting of the safety valve assembly.

FIG. 5 is a vertical sectional view of a modified form of safety valve assembly constructed in accordance with a portion of this invention.

FIG. 6 is a vertical sectional view taken generally along line 6—6 of FIG. 4.

FIG. 7 is a view, similar to FIG. 6, and shows the cam ring in the alternate position.

FIG. 8 is a view, similar to FIG. 5, and shows the safety valve assembly bodily lifted from the metallic tank shell to increase the discharge area.

Figure 9:
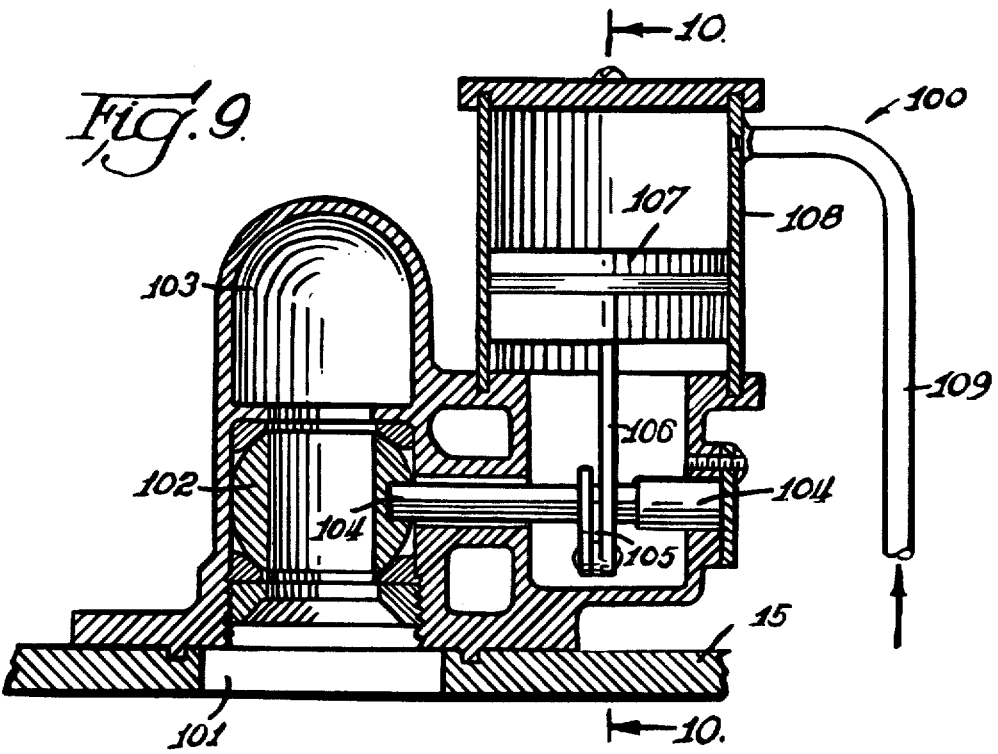
FIG. 9 is a vertical sectional view taken generally along line 9—9 of FIG. 10 and shown a conventional unloading and loading pressure operated valve which can be controlled in accordance with this invention.

In FIG. 1 reference character 10 designates, generally, a tank car arranged for railway operation. It includes a tank 11 for fluid such as liquid or gas. The tank 11 can be constructed for use with a tank truck or it may represent a stationary tank for containing liquid or gas under pressure. Valves and other devices, indicated generally at 12, are provided for loading and unloading the tank 11 and include the safety valve construction of this invention. They may be otherwise located on the tank shell.

In FIGS. 2 and 3 it will be noted that reference character 15 designates the metallic tank shell or the mounting plate for valves and devices of the tank 11 and that for illustrative purposes a liquid 16 is shown but it will be understood that the tank may contain a gas under pressure and that it may be partially liquefied. At any event it will be understood that the tank 11 is intended to contain a fluid which applies a substantial pressure to the metallic tank shell 15 when the tank 11 is subjected to external heat such as fire which may be incident to accident conditions. Mounted on the metallic tank shell 15 is a safety valve assembly that is indicated, generally, at 17. It includes a valve housing 18 provided with a laterally extending mounting flange 19 which is arranged to be secured in sealed engagement with the metallic tank shell 15 by bolts or studs one of which is indicated at 20. The valve housing 18 is provided with a discharge opening 21 for the tank 11. A valve plug 22 normally closes the opening 21. Overlying the valve plug 22 is a seal disc 23 positioned at the lower end of a guide stem 24 which is guided for vertical movement in a support 25 that is centrally located with respect to a vent tube 26 that extends upwardly from the valve housing 18. The metallic tank shell 15 is provided with an opening 28 centrally of the valve housing 18. The valve plug 22 is located at the upper end of a valve stem 29 which extends downwardly through the opening 28 and centrally of a valve guide tube 30 which is secured at its upper end to the central portion of the valve housing 18. The valve guide tube 30 extends downwardly through the opening 28 for a substantial distance. Openings 31 are provided in the wall of the valve guide tube 30 so that its interior is always at the same pressure as the interior of the tank 11 and flow from the tank interior is relatively unobstructed through the guide tube 30 and discharge opening 21 to the atmosphere. A coil compression spring 32 is employed for biasing the valve plug 22 to the closed position. The preset compression of the coil compression spring 32 is so related to the pressure which is likely to be developed within the tank 11 as to hold the valve plug 22 in the closed position when the tank 11 is subjected to normal ambient temperature. It is only when the pressure within the tank 11 exceeds this predetermined pressure that the force by the coil compression spring 32 holding the valve plug 22 closed is exceeded by the force from tank internal pressure acting to move the valve plug 22 to the open position. At that time it moves upwardly to permit the release of fluid from the tank 11 through the discharge opening 21 and the vent tube 26.

It will be observed that the coil compression spring 32 reacts at its upper end against under side 33 of the valve housing 18. At its lower end the coil compression spring 32 reacts against the upper side 34 of a valve stem guide or collar 35 which is slidably mounted on the valve stem 29 and within the valve guide tube 30. Apertures 36 are provided in the valve stem guide 38 so that pressure on both sides of it will always be the same. Below the valve stem guide 35 there is an abutment nut 37. Between the underside of the valve stem guide 35 and the upper side of the abutment nut 37 there is normally positioned a clevis 38 which holds the valve stem guide 35 in spaced relation to the abutment nut 37 and the coil compression spring 32 under predetermined tension.

A basic element of this invention is the identification of the emergency conditions of high internal pressure in tank 11 due to a greater-than-normal heat input which also produces heating of the tank shell 15 and as a consequence a reduced ability of the tank 11 to safely contain internal pressure. The detection activation assembly 45 is provided for this purpose. The function of the detection activation assembly 45 is to accept normal short duration openings of the safety valve plug 22 without, in any way, altering the normal function of the safety valve. In the case of an extended duration opening of the safety valve plug 22, however, the detection activation assembly 45 functions to permit tank internal pressure to enter piping system 64 of FIGS. 2 and 3, piping system 71 of FIGS. 4, 5, and 8, and/or piping system 109 of FIG. 9. The introduction of tank internal pressure to any one or all of such piping systems and, as a consequence, to actuators 41, 85, and 100 alters the mode of operation of the safety valve 17 permitting the safety valve 17 to open at a reduced internal tank pressure and with an increased flow area resulting in a higher rate of discharge of fluid under pressure contained in the tank.

The detection activation assembly 45 illustrated is only one effective timing-actuation device. There are several commercially available devices which perform like function. These may include devices operated by mechanical, electrical, or fluid pressure means and any of these may be employed satisfactorily to perform the dual functions of identifying greater than normal extended time the plug 22 remains in the open position and of introducing tank internal pressure to the several and various piping systems mentioned earlier.

The detection activation assembly 45 includes a suitably sealed first piston 55 that is slidably mounted in a cylinder 56 which is provided in a housing 44. The diameter, and therefore the pressure area, of the piston 55 must be smaller than the area of the plug 22 for reasons later explained. An extension 57 of the valve stem 29 is threaded into the first piston 55 so that it moves conjointly with the valve stem 29. Ports 58 are provided in the housing 44 to place that portion of the cylinder 56 above the first piston 55 in communication with the interior of the tank 11. Below the first piston 55 and slidably mounted in the lower end of the cylinder 56 is a suitably sealed second piston 59. A coil compression spring 60 is interposed between the pistons 55 and 59 and spacer struts 61 from the first piston 55 hold the pistons in predetermined spaced relation at a minimum distance. It will be noted that the lower end of a vent tube 52 is connected at 62 to the portion of the cylinder 56 between the pistons 55 and 59 so that this space is always at atmospheric pressure. Normally the second piston 59 is interposed between ports 63 which may be located on opposite sides of the cylinder 56.

As the plug 22 of the safety valve 17 opens in response to normal short duration tank internal pressure increases, the valve stem 29, valve stem extension 57 and the first piston 55 moves conjointly relieving the preset compression of the coil compression spring 60 and moving the spacer struts 61 out of a position in which they positively restrain the movement of the second piston 59. Under normal short duration openings of the plug 22 there is a subsequent closing of the plug 22 under the influence of the compression spring 32 responding to reduced tank internal pressure as a result of previous venting through the open safety valve 17.

It will be noted that the interior surface of valve plug 22 is exposed to tank internal pressure and that, with particular reference to FIG. 2, the upper surface of piston 55 is exposed to internal tank pressure. This internal tank pressure is communicated to cylinder 56 through openings 58. Piston 55 and valve plug 22 are connected by means of valve stem extension 57 and valve stem 29. Because the pressure area of piston 55 is less than the pressure area of valve plug 22, net pressure bias against valve plug 22 or, with reference to FIG. 2, in the upward direction is produced. This net pressure bias permits valve 22 to be opened when the internal tank pressure reaches a predetermined valve actuating pressure. Appropriate adjustment of the compression of coil spring 32 will permit the valve to respond to different actuating pressures. The desired actuating pressure is, of course, a function of the desired circumstances in which the valve of the instant invention is to be employed.

Under abnormal conditions of excessive heat input to the tank 11 resulting in sustained higher internal tank pressure the plug 22 opens and remains open for finite and increased time duration. With the influences of the compression spring 60 and the spacer struts 61 reduced and removed, the second piston 59 is relatively free to move upwards in FIG. 2 to the position shown in FIG. 3. The remaining force downward due to the compression spring 60 is overcome by tank internal pressure introduced to the cylinder space below piston 59 through choke orifice 65. The rate of movement of piston 59 is controlled by the choke orifice 65 size.

Should a closing of the plug 22 occur prior to complete movement of the piston 59 the mechanical elements 29, 57, 55, and 61 combine to force the piston 59 back to its original position shown in FIG. 2. Should the plug 22 remain open however for a predetermined finite time duration the rate controlled upward travel of the piston 59 uncovers ports 63 which are located at the same elevation but at different radial locations through the cylinder 56 wall. Suitable sealing means are provided for piston 59 to prevent axial or circumferential leakage of fluid.

As the ports 63 are uncovered by the upward travel of piston 59 tank internal pressure enters port 63 on the left in FIGS. 2 and 3 and is permitted to flow through the lower portion of the cylinder 56 below piston 59 into piping system 64. Use is made of this pressurized fluid potential energy to perform actuation functions altering the safety valve mode as later described.

As will appear hereinafter, provision is made for changing the compression of the coil compression spring 32 so as to lower the pressure required to move the valve plug 22 to the open position. It is for this purpose that the clevis 38 is employed. When it is withdrawn, as shown in FIG. 3, the coil compression spring 32 is allowed to expand to bring the valve stem guide or collar 35 in contact with the abutment nut 37. In this manner the force exerted by the coil compression spring 32 holding the valve plug 22 closed is reduced and it will be opened at a lower pressure within the tank 11.

For controlling the operation of the clevis 38 and withdrawing it from the position shown in FIG. 2 to that shown in FIG. 3, a valve actuating modifying means, indicated generally at 41, is employed. It includes a cylinder 42 which is suitably secured to upper end 43 of a housing 44 which is secured to and depends from the lower end of the valve guide tube 30. At its lower end the housing 44 is provided with the detection activation assembly that is indicated, generally, at 45. Its function has already been explained.

As shown in FIG. 2 the clevis 38 is pivoted at 46 to one end of a piston rod 47 that extends through opening 48 and 49 in the valve guide tube 30 and the upper end 43 of the housing 44. The piston rod 47 is suitably guided within the cylinder 42 and is arranged to be operated by a piston 50 which is slidable in the cylinder 42 on application thereto of suitable pressure on the left side. Vent tubes 51 and 52 place that portion of the cylinder 42 to the right of the piston 50 in communication with the atmosphere through the metallic shell 15 as indicated in FIG. 2. Pressure applied through piping 64 to the left side of piston 50 moves the piston 50 to the right withdrawing the clevis 38.

A small diameter bleed tube 66 interconnects the conduit 64 and the lower end of the vent tube 52 to release minor leakage which may take place through and around the seals of piston 59 and piston rod 47. The flow capacity of tube 66 is sufficiently small so as to avoid interference with the operation of actuator 41 when piston 59 permits tank internal pressure to flow through ports 63 and piping 64 to cylinder 42.

In describing the operation of the safety valve assembly 17 it will be assumed first that the pressure within the tank 11 and against the metallic shell 15 does not exceed the normal pressure that is expected and for which the coil compression spring 32 is adapted to hold the valve plug 22 in the closed position shown in FIG. 2. If the pressure increases due to the tank 10 being subjected, for example, to external heat then the fluid pressure applied to the valve plug 22 may be such as to overcome the biasing action of the coil compression spring 32. The valve plug 22 then opens to relieve the pressure by allowing the flow of fluid through the discharge opening 21. The clevis 38 moves upwardly along with the valve stem 29 as does the first piston 55. The spring 60 acts to hold the second piston 59 in the closed position. However, internal tank pressure is applied through the orifice choke 65 to the lower side of the second piston 59 and it tends to rise. Now if the pressure within the tank is relieved by opening of the valve plug 22, the coil compression spring 32 may be of sufficient strength to reclose the valve plug 22. As previously explained this forces piston 59 to its original position insuring that no flow passes through ports 63, thus preventing the modification of normal safety valve operation. Should the heat input increasing tank internal pressure be sufficient to hold the plug 22 open for a sufficient length of time to permit piston 59 to move clear of blockage of ports 63, actuator 41 is activated by fluid pressure to remove clevis 38 to the position shown in FIG. 3. Thereupon the valve stem guide or collar 35 moves downwardly until it engages the upper side of the abutment nut 37. Consequently the coil compression spring 32 is capable of exerting only a lesser closing force against the valve plug 22 with the result that a lower internal tank pressure is sufficient to effect opening of the valve plug 22. This corresponds to a lowering of the mechanical strength of the metallic tank shell 15 due to the continued application thereto of external heat.

It will be understood that the foregoing operation of the safety valve assembly 17 is intended to take place only under emergency conditions. After they pass, the system is manually reset. However, it will be understood that the internal tank pressure has not been allowed to build up to such an extent that the metallic tank shell 15 itself is ruptured.

The foregoing elements of the system lower the set-to-discharge pressure to a level compatible with the reduced tank strength at elevated temperature. With a substantial input of heat from an external fire it is also important to increase the area available to discharge the tank fluid contents. At high levels of heat input the rate of fluid vaporization, and consequently the tank internal pressure, increase more rapidly than can be accommodated by the restricted flow through the discharge opening 21 of the safety valve. If additional area is not provided the tank internal pressure will continue to increase beyond safe levels even though the plug 22 is continuously held open and the set-to-discharge pressure has been reduced.

Figure 10:
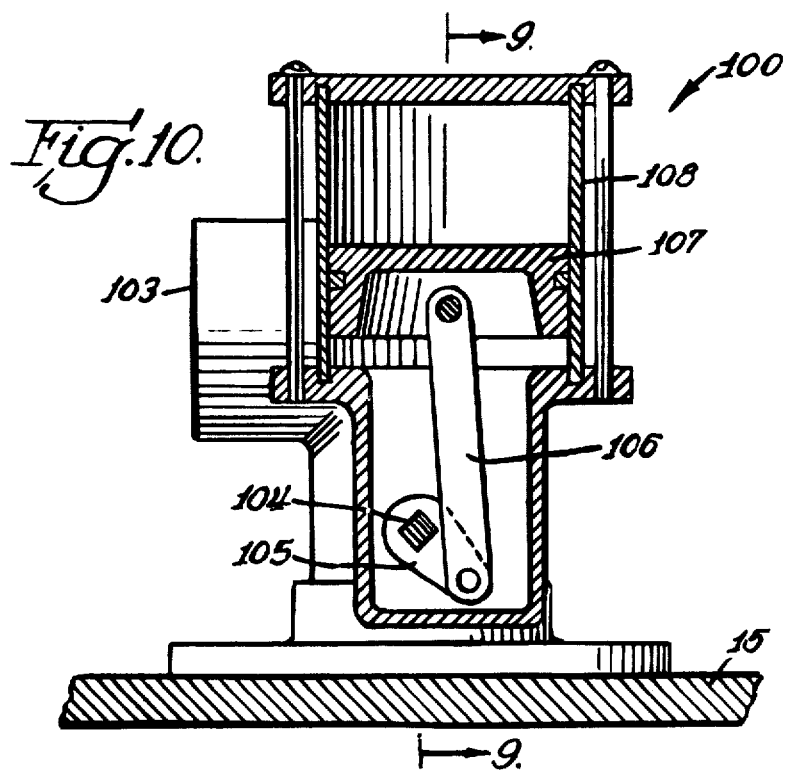
FIG. 10 is a vertical sectional view taken generally along line 10—10 of FIG. 9.

FIGS. 9 and 10 show how the discharge area for the tank 11 can be increased to vent sufficient quantities of the fluid contents to the atmosphere to prevent rupture of the metallic tank shell 15. There is illustrated here, generally, at 100 unloading or loading pressure operated valve means of conventional construction. It may be located over an opening 101 and suitably sealed to the outside of the metallic tank shell or the valve mounting plate 15. There is provided a ball valve 102 which is illustrated in the open position. Here it places the opening 101 in communication with an outlet part 103 to the atmosphere. A shaft 104 is provided through the valve housing to rotate the ball between open and closed positions and to which is secured a crank arm 105. The crank arm 105 is connected by a link 106 to a piston 107 which is slidable in a cylinder 108. A conduit 109 is arranged to connect the cylinder 108 to either the conduit 64 or the conduit 71 depending on which construction is employed. A manual override of the valve actuating mechanism, 109, 108, 107, 106, 105, and 104 is provided so that manual opening and closing of the ball valve may be used in the normal way for loading and unloading operations. In operation, when the tank internal pressure is applied either individually or in combination to the valve actuating modifying means 41 or 85 the unloading and loading pressure operated valve means 100 is operated to the position shown in FIGS. 9 and 10. The operation of the detection activation assembly 45 is employed to identify emergency conditions requiring alternative mode operation of the safety valve 17 in an identical manner as previously described. Upon release of tank internal pressure by piston 59 to ports 63 and then to piping system 64, through a direct connection between piping system 64 and piping system 109 such pressure is introduced to cylinder 108 to open the ball valve to the position shown in FIGS. 9 and 10. Thus, in addition to the discharge area provided at discharge opening 21 of safety valve 17 and discharge area additionally provided in the manner later to be described as opening 28 in FIGS. 5 and 8, the pressure operated valve means 100 provides for further increase in the discharge area and further lessening of the likelihood that the metallic tank shell 15 will be ruptured.

In FIGS. 4, 5, 6, 7, and 8 there is illustrated another form of the invention in which the safety valve assembly 17 is employed with certain modifications. Here it will be observed that the valve actuating modifying means 41 in the form illustrated in FIG. 2 is omitted. Normally the coil compression spring 32 is extended to the fullest extent with the valve stem guide 35 bearing against the abutment nut 37. The detection activation assembly 45 is identical to that shown in FIGS. 1 and 2 but the piping system is reidentified from 64 to 71 to distinguish the alternative system from the system employing assembly 41 previously described.

In the embodiment shown in FIGS. 4, 5, 6, 7, and 8 the entire safety valve assembly 17 is arranged to be lifted upwardly for the purpose of increasing the discharge area for the pressurized fluid within the tank 11 to be released to atmosphere.

In particular the mounting flange 19 is arranged to be moved upwardly to the position shown in FIG. 8. For this purpose mounting bolts 73 are employed. As shown in FIG. 4 four mounting bolts 73 can be used. The mounting bolts 73 extend through the mounting flange 19, the metallic tank shell or mounting plate 15 and through spacer means in the form of a cam ring 74. Interposed between the metallic tank shell or mounting plate 15 and the cam ring 74 are tubular spring guide spacers 75 within which coil compression springs 76 are located. The upper end of each coil compression spring 76 bears against inside 77 of the metallic tank shell or mounting plate 15 and the upper side 78 of a lower end closure 79 of the respective spring guide spacer 75.

When the safety valve assembly 17 is installed, as shown in FIG. 5, nuts 73' are tightened on the mounting bolts 73 to such an extent that the mounting flange 19 is held in sealing engagement against the upper side of the metallic tank shell or mounting plate 15. The springs 76 are held captive within the tubular spring guide spacer 75 but, at this time, have no effect on the upward movement of the mounting flange 19 to increase the discharge area from the tank 11.

In order to permit the coil compression springs 76 to take control of the opening movement of the mounting flange 19 provision is made for pivoting the cam ring 74 from the position shown in FIG. 5 to the position shown in FIG. 8. For this purpose a lateral flange 81 is provided on the lower end of the housing 44 to support the cam ring 74. The cam ring 74 pivots about the safety valve center line using the housing 44 as a rotational guide. An arm 82 extends radially from the cam ring 74 shown more clearly in FIG. 4. One end of a pair of links 83 is connected to the distal end of the arm 82 while the other end is connected to a piston rod 84 which forms a part of valve actuating modifying means, indicated generally at 85. This means includes a cylinder 86 within which a piston 87, connected to the piston rod 84, is slidable. A vent 88 connects the lower chamber of cylinder 86 in FIG. 4 to the atmosphere. A small diameter bleed tube 90 is provided with a similar purpose to that of bleed tube 66 in FIG. 2, previously described. The cylinder 86 may be supported by an arm 89 which extends from the underside of the housing 44 and suitably carries the cylinder 86 at its distal end or by other suitable means.

As shown in FIG. 4 cylindrical openings 93 are provided in the cam ring 74 for receiving the lower ends of the tubular spring guide spacers 75. Inclined cam surfaces 94, FIGS. 6 and 7, interconnect surfaces 95 on the upper side of the cam ring 74 against which the lower ends of the tubular spring guide spacers 75 normally react and the cylindrical openings 93. Slots 96 are formed in the cam ring 74 to permit the lower ends of the mounting bolts 73 to move conjointly with the tubular spring guide spacers 75 to the alternate position.

In operation after the valve plug 22 has opened and remained open for an extended time duration in the manner previously described for the detection activation device 45 operation pressure is applied through the ports 70 and the conduit 71 to the piston 87 in the valve actuating modifying means 85. The cam ring 74 then is pivoted as indicated by arrow 97 in FIG. 6 and arrow 98 in FIG. 4 and is moved to the position shown in FIG. 7. This is accompanied by downward movement of the tubular spring guide spacers 75 into the cylindrical openings 93 to a position of engagement with surface 99 where the coil compression springs 76 then constitute the sole force tending to hold the mounting flange 19 in the sealed position.

Because the combined force of compression springs 76 is designed to be less than the tank internal pressure force on the safety valve assembly 17 at the set-to-discharge pressure of the safety valve 17 the safety valve 17 moves upward through the opening 28 to a position such as illustrated in FIG. 8. This provides discharge area for the pressurized fluid in the tank to escape to atmosphere in addition to that area originally provided for this purpose at 21.

The transfer of the closing function from the compression spring 32 within the safety valve 17 to the springs 76 restraining the upward movement of the entire safety valve assembly 17 permits design of a reduced set-to-discharge pressure for the entire safety valve assembly 17 and the springs 76 to be the level of tank shell ability to contain internal pressure at elevated temperature.

The openings 31 in the valve guide tube 30 must provide a total flow area for tank internal pressure escape equal to or greater than the flow area of the discharge opening 28 in the metallic tank shell 15 and also greater than the flow area between the mounting flange 19 and the tank shell or mounting plate 15. Alternatively the guide tube may be functionally replaced by a series of vertical guide struts similar to the spacer struts 61 previously described.

What is claimed as new is:

1. A pressure relief valve construction for a fluid pressure containing tank, such as a railway tank car, comprising: means providing a discharge opening for said tank, valve means adapted to be subject to tank pressure for closing said opening, biasing means for holding said valve means closed until a predetermined fluid pressure is applied thereto whereupon it is opened, fluid flows through said discharge opening, and said fluid pressure is reduced, and means responsive to the time duration said valve means is in an open position for changing the pressure at which said fluid pressure is released from said tank.

2. The pressure relief valve construction called for by claim 1 wherein said means responsive to opening of said valve means includes: valve actuating modifying means, and valve means responsive to tank pressure for applying said pressure to said valve actuating modifying means for operating the same.

3. The pressure relief valve construction called for by claim 1 wherein said means providing a discharge opening includes a flange adapted to be secured to a wall of said tank, a perforate sleeve extends from said flange for positioning in said tank, said valve means includes a valve stem extending through said sleeve, and said biasing means reacts between said flange and said valve stem.

4. The pressure relief valve construction called for by claim 3 wherein cylinder means extends endwise from said sleeve, a first piston connected to said valve stem is movable therewith in said cylinder means, a second piston is slidable in said cylinder means and functions as a valve to apply tank pressure to valve actuating modifying means to effect said change in pressure at which said fluid pressure is released, and spring means between said pistons biases them apart.

5. The pressure relief valve construction called for by claim 4 wherein valve actuating modifying means is connected to said valve stem and is controlled by said second piston to vary the connection between said biasing means and said valve stem.

6. The pressure relief valve construction called for by claim 5 wherein a collar is slidable on said valve stem against which said biasing means bears, abutment means is secured to said valve stem, and spacer means between said collar and said abutment means is arranged to be withdrawn by said valve actuating modifying means to change the action of said biasing means reacting between said flange and said valve stem.

7. The pressure relief valve construction called for by claim 4 wherein orifice means is provided for interconnecting said cylinder means and the interior of said tank to apply tank pressure to said second piston at a reduced rate.

8. The pressure relief valve construction called for by claim 3 wherein flange spring means biases said flange into sealing engagement with said wall of said tank, spacer means is interposed between said flange and said flange spring means, and valve actuating modifying means is connected to said spacer means to shift the same and vary the force applied by said flange spring means to said flange to permit the same to move away from said tank wall at a predetermined tank pressure and allow fluid discharge therepast.

9. The pressure relief valve construction called for by claim 8 wherein said flange spring means comprises a plurality of coil compression springs, a mounting bolt is arranged to extend from said flange through said tank wall into said tank and through each compression spring, and said spacer means comprises a cam ring interposed between each compression spring and the respective mounting bolt.

10. The pressure relief valve construction called for by claim 9 wherein a spring guide encloses each compression spring and is arranged at one end to react against the inside of said tank wall and at the other end against said cam ring.

11. The pressure relief valve construction called for by claim 9 wherein cylinder means extends endwise from said sleeve, a first piston connected to said valve stem is movable therewith in said cylinder means, a second piston is slidable in said cylinder means and functions as a valve to apply tank pressure to said valve actuating modifying means, spring means between said pistons biases them apart, and means pivotally mount said cam ring around said cylinder means.

12. The pressure relief valve construction called for by claim 2 wherein at least one loading and unloading pressure operated valve means is provided for supplying and removing fluid to and from said tank, and means is provided for applying said tank pressure to said pressure operated valve means for opening the same on application of said tank pressure to said valve actuating modifying means.

13. A pressure relief valve adapted for use in association with a pressurized system containing a fluid, said pressure relief valve comprising: valve means movable from a closed to an open position: biasing means exerting a given magnitude of force against said valve means for holding said valve means in a closed position until a given pressure is developed in said system whereupon said valve means moves to said open position; first means responsive to the time duration said valve means is in an open position; and second means for changing the magnitude of force exerted against said valve means by said biasing means; said first means being operatively connected to said second means to activate said second means when said valve means is in an open position for a given time duration.

14. The pressure relief valve defined in claim 13 wherein said first means utilizes the pressure in said system to activate said second means.

15. A pressure relief valve adapted for use in a system containing a fluid, said pressure relief valve comprising: valve means movable from a closed to an open position; biasing means exerting a given magnitude of force against said valve means for holding said valve means in a closed position until a given pressure is developed in said system whereupon said valve means moves to said open position; first means responsive to the time duration said valve means is in an open position; second means for reducing the magnitude of force exerted against said valve means by said biasing means; said first means being operatively connected to said second means to activate said second means when said valve means is in an open position for a given time duration; whereby, when said valve means is in an open position for said given period of time said first means activates said second means and a reduced magnitude of force is exerted against said valve means by said biasing means.

16. The present relief valve in claim 15 wherein said first means utilizes the pressure in said system to activate said second means.

17. A pressure relief valve adapted for use in association with a pressurized system containing a fluid, said pressure relief valve comprising: valve means movable from a closed to an open position; biasing means holding said valve means in a closed position until a given pressure is developed in said system whereupon said valve means moves to said open position; first means responsive to the time duration said valve means is in an open position; and, second means for changing the discharge capacity for release of fluid from said system; said first means being operatively connected to said second means to activate said second means when said valve means is in an open position for a given time duration.

18. The pressure relief valve defined in claim 17 wherein said first means utilizes the pressure in said systen to activate said second means.

19. A pressure relief valve adapted for use in association with a pressurized system containing a fluid, said pressure relief valve comprising: valve means movable from a closed to an open position; biasing means holding said valve means in a closed position until a given pressure is developed in said system whereupon said valve means moves to said open position to provide a given discharge capacity for release of fluid from said system; first means responsive to the time duration said valve means is in an open position; and, second means for providing a greater discharge capacity for release of fluid from said system; said first means being operatively connected to said means to activate said second means when said valve means is in an open position for a given time duration.

20. The pressure relief valve defined in claim 18 wherein said first means utilizes the pressure in said system to activate said second means.

21. A pressure relief valve construction adapted for use in association with a pressurized system containing a fluid, said pressure relief valve construction comprising: valve means movable from a closed to an opened position; biasing means exerting a given magnitude of force against said valve means for holding said valve means in a closed position until a given pressure is developed in said system whereupon said valve means moves to said open position to provide a given discharge capacity for release of fluid from said system; first means responsive to the time duration said valve means is in an open position; second means for changing the magnitude of force exerted against said valve means by said biasing means; and third means for changing the discharge capacity for release of fluid from said system; said first means being operatively connected to said second and third means to activate said second and third means when said valve means is in an open position for a given time duration.

22. The pressure relief valve defined in claim 13 wherein said first means utilizes the pressure in said system to activate said second and third means.

23. A pressure relief valve adapted for use in association with a pressurized system containing a fluid, said pressure relief valve comprising: valve means movable from a closed to an open position; biasing means exerting a given magnitude of force against said valve means for holding said valve means in a closed position until a given pressure is developed in said system whereupon said valve means moves to said open position to provide a given discharge capacity for release of fluid from said system; first means responsive to the time duration said valve means is in an open position; second means for reducing the magnitude of force exerted against said valve means by said biasing means; and third means for providing a greater discharge capacity for release of fluid from said system; said first means being operatively connected to said second and third means to activate said second and third means when said valve means is in an open position for a given time duration.

24. The pressure relief valve defined in claim 23 wherein said first means utilizes the pressure in said system to activate said second and third means.

* * * * *